May 12, 1931.                    J. A. REECE                    1,805,260
                            SHEET GLASS APPARATUS
                             Filed July 16, 1927
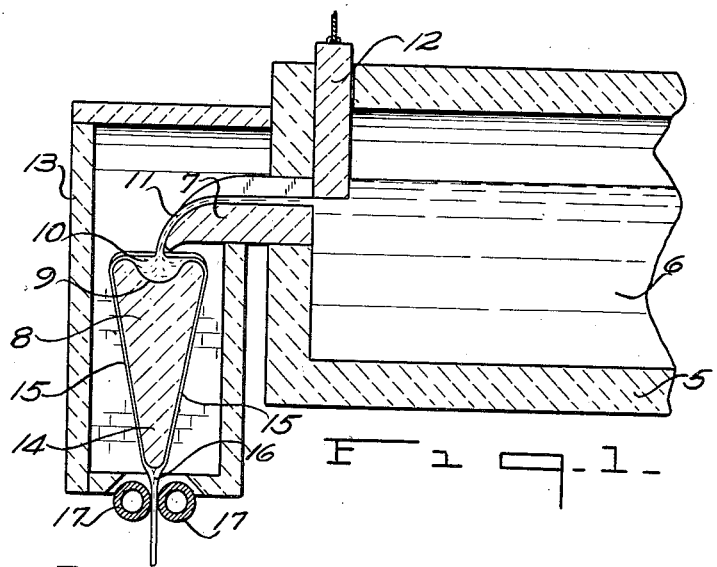
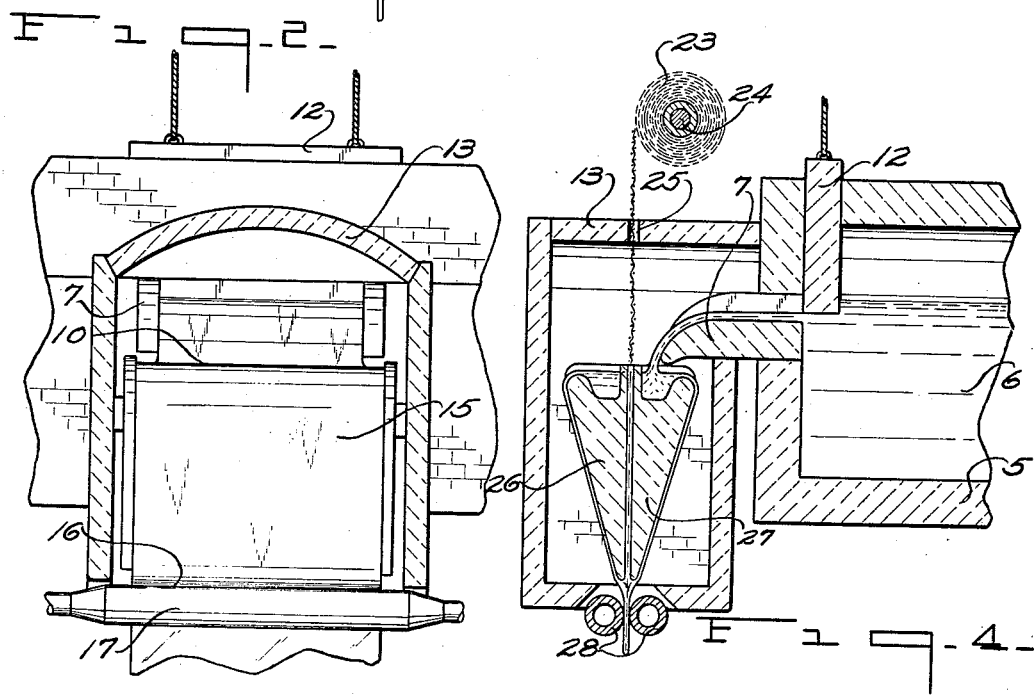
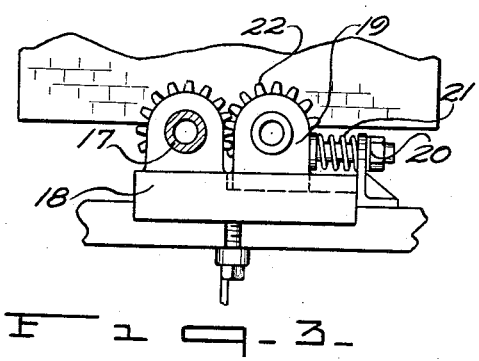
Inventor
Joseph A. Reece
By Frank Fraser
                                              Attorney Patented May 12, 1931

1,805,260

UNITED STATES PATENT OFFICE

JOSEPH A. REECE, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed July 16, 1927. Serial No. 206,145.

The present invention relates to sheet glass apparatus.

An important object of the present invention is to provide an apparatus adapted for the production of sheet glass wherein molten glass is flowed or drawn downwardly in sheet form and passed between suitable members to reduce the sheet to a predetermined and uniform thickness.

Another object of the invention is to provide in sheet glass apparatus, a slab down which molten glass is permitted to flow to form a sheet, the sheet, after it has been formed, passing between rotatable members which are adapted to reduce said sheet to a predetermined and uniform thickness.

Still another object of the invention is to provide an apparatus of this nature including a slab having a molten glass receiving trough formed in its upper end whereby molten glass may be deposited within said trough and permitted to overflow the sides thereof whereby the glass flows down the opposite converging sides of the slab in film formations which unite at the bottom of the slab to form a single sheet, the apparatus also including a pair of rolls arranged in proximity to the lower end of the slab and adapted to form a pass through which the sheet passes to be reduced to a flat sheet of uniform predetermined thickness.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through a portion of a machine illustrating my invention, Fig. 2 is an elevation thereof, Fig. 3 is an elevation showing a part of the structural details, and Fig. 4 is a fragmentary vertical longitudinal section illustrating a modified form of machine.

Referring to the drawings, the numeral 5 designates the exit end of a tank furnace adapted to contain a mass of suitably refined molten glass 6. A discharge lip 7 is associated with the end of the tank 5, and terminates above a slab 8 which may be adjustably mounted if desired. The slab 8 is preferably provided with a troughed top 9 for receiving a mass of molten glass 10 resulting from the flow 11 passing from the furnace over the lip 7. An adjustable gate member 12 may be arranged as shown to control the flow of glass passing into the trough 9. The slab 8 is preferably arranged in a temperature controlled compartment 13.

It will be seen that the sides of the slab 8 converge toward the bottom 14 so that as the glass flows into the trough 9 it will, after a suitable amount has been introduced, overflow the edges of the trough and pass down the sides of the slab, in film formations 15. The films of glass 15 unite at the bottom or lower edge of the slab to form a single sheet 16.

Arranged in proximity to the lower end of the slab 14 is a pair of preferably positively driven rolls 17. The rolls 17 may be formed from any suitable noncorrosive alloy and may be either heated or cooled as desired, such as by passing a suitable temperature control medium through the bore of said rolls.

In Fig. 3 is illustrated one form of mounting and operating mechanism which may be used for supporting and driving the rolls 17. As shown, one of the rolls 17 is journaled in a fixed bracket 18, while the second roll is carried by a support 19 movably associated with the bracket 18. An adjusting mechanism 20 is provided to control the distance between the rolls. The spring 21 is provided to normally urge the rolls toward each other but is of such a nature that the rolls can be separated to permit the passage of clay, etc. that may possibly find its way down to the rolls from the furnace, thus preventing damage to the rolls. The rolls each have associated therewith a gear 22 and the gears may mesh as illustrated so that the rolls will be rotated in opposite directions, the teeth of the gears being sufficiently long to permit adjustment of the rolls without throwing said gears out of mesh. Obviously, an independent gear and drive therefor can be associated with each roll, if desired.

In operation, the molten glass is suitably prepared in the furnace 5 and permitted to flow upon the slab 8 in a manner that the films may flow down the opposite sides of the slab to be united at the lower edge thereof. The rolls 17 may be operated to positively draw the sheet from the bottom of the slab, or the sheet may be permitted to flow and merely be flattened or reduced to a predetermined thickness as it passes between said rolls. It will be understood from Fig. 2 that the rolls extend entirely across the sheet and in contact therewith so that the finished sheet will have a thickness dependent upon the space between the rolls as shown in Fig. 1. Any suitable conveying means may be used to take care of the sheet after it has passed between the rolls 17.

Particularly in the production of plate glass where glass sheets are ground and polished, it is desirable to use a sheet which is as flat as possible to minimize the amount of work required for the grinding operation. By using the rolls 17 as illustrated, the sheet is made flat before it has had a chance to become set, so that subsequent grinding and polishing can be accomplished in a minimum of time. Although, I prefer that the rolls 17 be highly polished, they may be rough or relatively rough if desired.

In Fig. 4 is illustrated a modified construction adapted for the production of so-called wire glass. In this embodiment of the invention a roll of wire fabric 23 may be mounted upon a suitable shaft 24 above the compartment 13, the mesh passing through an opening 25 and between the two sections 26 and 27, respectively, comprising the slab. In Fig. 1, the slab is formed in an integral structure, while in Fig. 4, the slab is formed in two sections to permit the passage of the wire mesh therethrough. Of course, each section of the slab will be provided with a trough for receiving the glass, the troughs communicating at their ends so that there will be a suitable source of supply of molten glass for flowing down the side of each section. At the bottom of the slab the wire mesh will emerge and receive a film of glass on each side, after which the combined structure will pass between the flattening and sizing rolls 28.

As stated above, the rolls may be used to positively draw the films from the bottom of the slab in sheet form, and to flatten the same, or the molten glass may be flowed from the slab and reduced in thickness by said rolls. In the latter instance, the sheet will be relatively thicker before it passes between the rolls than after.

Although but a single set of rolls are illustrated, a plurality of sets or pairs of rolls may be used.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a substantially vertically arranged slab composed of two adjacent sections having a vertical opening therebetween, each section having a trough in its upper end and the opposite ends of the troughs of the two sections communicating with one another, means for flowing glass into one of said troughs from where a portion of it will pass into the other trough, the glass flowing from the troughs downwardly over the slab to form a sheet, and means for passing a wire mesh downwardly through the opening between the slab sections.

2. In sheet glass apparatus, a substantially vertically arranged slab composed of two adjacent sections having a vertical opening therebetween, each section having a trough in its upper end and the opposite ends of the troughs of the two sections communicating with one another, means for flowing glass into one of said troughs from where a portion of it will pass into the other trough, the glass flowing from the troughs downwardly over the slab to form a sheet, means for passing a wire mesh downwardly through the opening between the slab sections, and a pair of rolls for reducing the sheet to the desired thickness as it leaves said slab.

Signed at Toledo, in the county of Lucas and State of Ohio, this 12th day of July, 1927.

JOSEPH A. REECE.